(12) United States Patent
Wang

(10) Patent No.: US 7,517,126 B2
(45) Date of Patent: Apr. 14, 2009

(54) LIGHT SOURCE STRUCTURE OF BACKLIGHT MODULE

(75) Inventor: Pei-Choa Wang, Gueishan Township, Taoyuan County (TW)

(73) Assignee: Pyroswift Holding Co., Limited, Wanchai (HK)

( * ) Notice: Subject to any disclaimer, the term of this patent is extended or adjusted under 35 U.S.C. 154(b) by 116 days.

(21) Appl. No.: 11/618,824

(22) Filed: Dec. 30, 2006

(65) Prior Publication Data
US 2008/0158882 A1 Jul. 3, 2008

(51) Int. Cl.
*F21V 7/04* (2006.01)

(52) U.S. Cl. .................. 362/607; 362/223; 362/600; 362/612; 362/800; 349/62; 349/65; 349/67; 385/129; 385/901

(58) Field of Classification Search ............ 362/27, 362/223–225, 260, 600, 603, 606, 607, 612, 362/613, 800; 349/62, 65, 67; 385/129, 385/901

See application file for complete search history.

(56) References Cited

U.S. PATENT DOCUMENTS

| 7,048,426 | B2 * | 5/2006 | Kao et al. ................. 362/616 |
| 2001/0019379 | A1 * | 9/2001 | Ishihara et al. ............. 349/65 |
| 2003/0206408 | A1 * | 11/2003 | Funamoto et al. ............ 362/31 |
| 2005/0007753 | A1 * | 1/2005 | Van Hees et al. ............. 362/31 |
| 2005/0030732 | A1 * | 2/2005 | Kimura et al. .............. 362/31 |
| 2007/0041190 | A1 * | 2/2007 | Chou ..................... 362/252 |

* cited by examiner

*Primary Examiner*—Sharon E Payne
*Assistant Examiner*—Mary Zettl

(57) ABSTRACT

A light source structure of a backlight module includes a casing, a heat sink, a plurality of light source generators, a first reflecting element and a second reflecting element. If a light emitting component of the light source generator is lit, a spot light source of the light emitting component is passed through an optical lens in a light pipe and converted into a linear light source to be projected onto an oblique surface of the first reflecting element. The oblique surface converts the linear light source into a planar light source to be projected from an opening of a casing to an oblique surface of the second reflecting element. The oblique surface of the second reflecting element guides the planar light source into the light guide plate, such that the light in the light guide plate is diffused uniformly to provide sufficient brightness to the light guide plate.

6 Claims, 11 Drawing Sheets

PROIR ART

PROIR ART

PROIR ART

LIGHT SOURCE STRUCTURE OF BACKLIGHT MODULE

BACKGROUND OF THE INVENTION

1. Field of the Invention

The present invention relates to a backlight module, and more particular to a backlight module that reflects a light source to a light guide plate by a multiple reflection.

2. Description of Prior Art

Since light crystal display (LCD) is not a self-emitting display device, an external light source is mandatory for achieving the display effect. Most liquid crystal displays adopt a backlight module to provide a uniform liquid crystal display panel and a high-brightness light source. The basic principle of the LCD adopts a spot light source or a linear light source, and effectively converts the spot or linear light source into a planar light source to provide a product emitting a planar light source with high brightness and uniform luminance.

In general, a backlight module can be divided into two types: a front light type and a back light type, and the back light type can be classified and developed into the following structures by their specifications and the positions of the lamps:

1. An edge lighting structure as shown in FIG. 1 sets a cold cathode fluorescent lamp 1a on a lateral side of a light guide plate 2a, and the light guide plate 2a adopts an injection molding printless design and the edge lighting structure is generally used in small or mid-size backlight modules below 18 inches, and an edge lighting light source design comes with a lightweight, thin, narrow-framed, and low power consumption features, and thus it can be used as a light source for mobile phones, personal digital assistants (PDAs) and notebook computers.

2. A bottom light structure as shown in FIG. 2 installs a cold cathode fluorescent lamp 1a at the back of the light guide plate 2a. Due to the super large backlight module, the edge lighting structure no longer maintains its advantages on weight, power consumption and brightness anymore, and thus the bottom light structure that installs the cold cathode fluorescent lamp 1a at the back of the light guide plate 2an is developed. The bottom light structure is applicable for portable LCD monitors and LCD TVs with relaxing requirements.

In recent years, light emitting diode (LED) becomes increasingly popular due to its compact size, low power consumption and long life expectancy, and it gradually takes over the traditional light bulb. For instance, LED is used extensively in traffic lights, automobile signal lights, flashlights, mobile phones, lamps and large outdoor billboards. Some light sources of the present backlight modules also adopt LED as a light source, and the LED 3 is usually installed on a lateral side or a backside of the light guide plate 2a as shown in FIGS. 3 and 4.

In fact, the heat source produced by an electrically connected LED 3a will affect the light emitting efficiency of the LED, and insufficient heat dissipation will cause the LED 3a unable to meet its specifications. To solve the aforementioned problem, some manufacturers reduce the input current (which is known as load reduction) to 60% of the specified value, so that the brightness of each LED 3a will fall below 60% of the specified value. More light emitting diodes are added to satisfy the brightness requirement, but such arrangement makes the manufacture more complicated and incurs a higher cost.

SUMMARY OF THE INVENTION

In view of the foregoing shortcomings of the prior art, the inventor of the present invention based on years of experience in the related industry to conduct experiments and modifications, and finally invented a light source structure of a backlight module.

Therefore, the present invention is to provide a light source structure that reflects a light source to a light guide by a multiple reflection, for reducing the number of light emitting diodes used, and allowing the light emitting efficiency of the light emitting diode to meet the requirement of its specification.

To achieve the objective, a light source structure of a backlight module in accordance with the present invention comprises the following elements:

A casing includes a containing space for accommodating a plurality of light source generators and a reflecting element, and a lateral side of the casing has an opening and an installing slot, and the opening and installing slot are interconnected with the containing space.

A heat sink is comprised of a thermal conducting element and a heat dissipating fin, and the thermal conducting element is installed in the installing slot.

A plurality of light source generators are installed on the thermal conducting element and the light source generators are installed on a substrate through a light emitting component, and the substrate is installed on the thermal conducting element. The thermal conducting element installs a reflector, and the reflector includes a light pipe disposed at an end of the substrate, and the light pipe installs a plurality of corresponding optical lenses therein, and the optical lenses focus the spot light source of the light emitting component to produce an output of a linear light source.

A first reflecting element is installed in the containing space, and the first reflecting element has an oblique surface perpendicular to a plurality of light source generators, and the thickness between the bottom surface and the oblique surface of the first reflecting element becomes thinner at the position proximate to the opening, such that the oblique surface and the opening are installed corresponding to each other, and the oblique surface can reflect the linear light source guided by the light pipe as a planar light source to be projected outside the casing.

A second reflecting element has an oblique surface disposed corresponding to a side of the light guide plate, an the oblique surface has a protrusion for refracting a continuous light source, such that a light source reflected from the first reflecting element to the second reflecting element can be diffused to achieve a uniform projection of the light source onto the light guide plate.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 1:
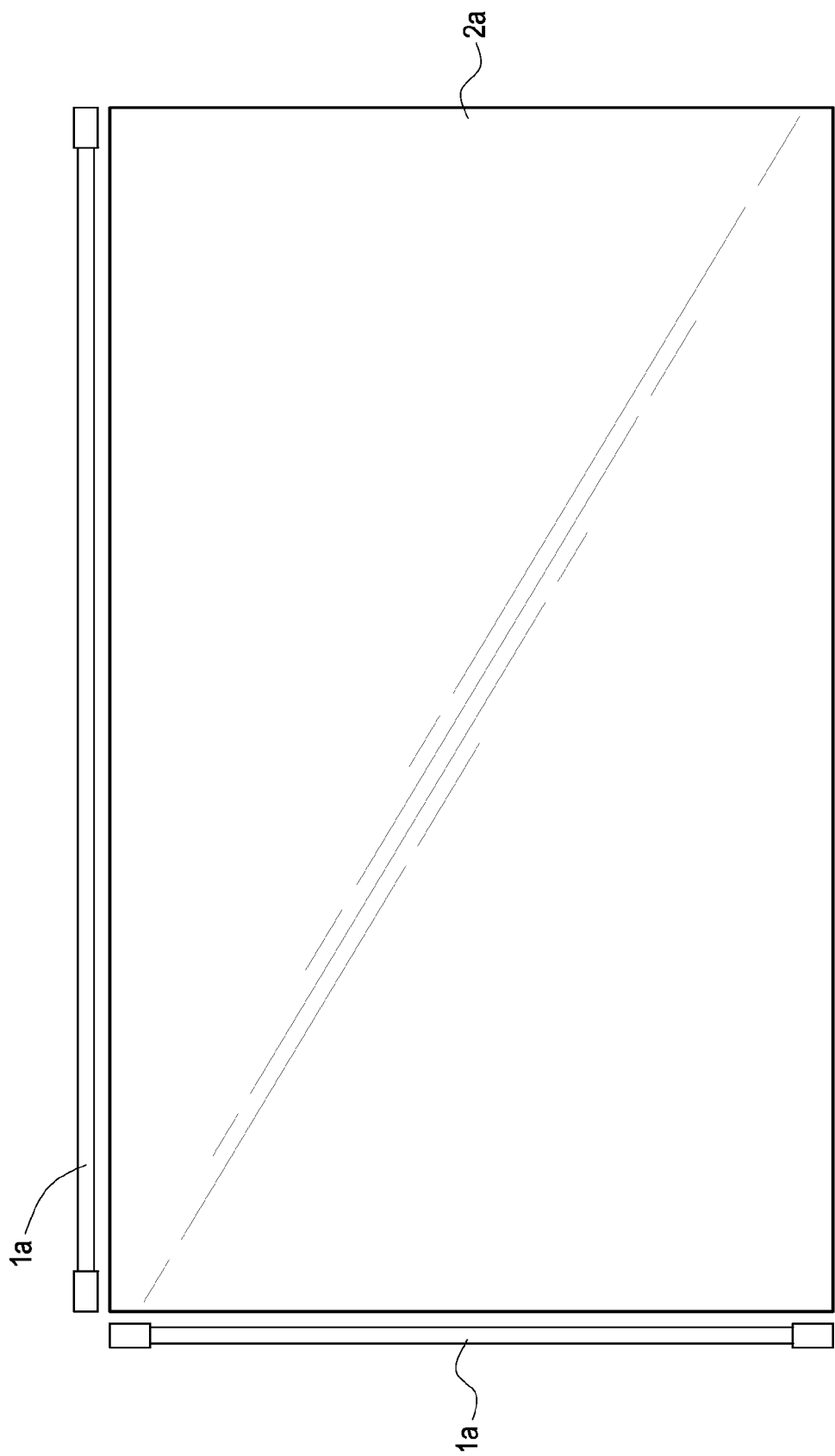
FIG. 1 is a schematic view of a first type of conventional backlight module structure.
Figure 2:
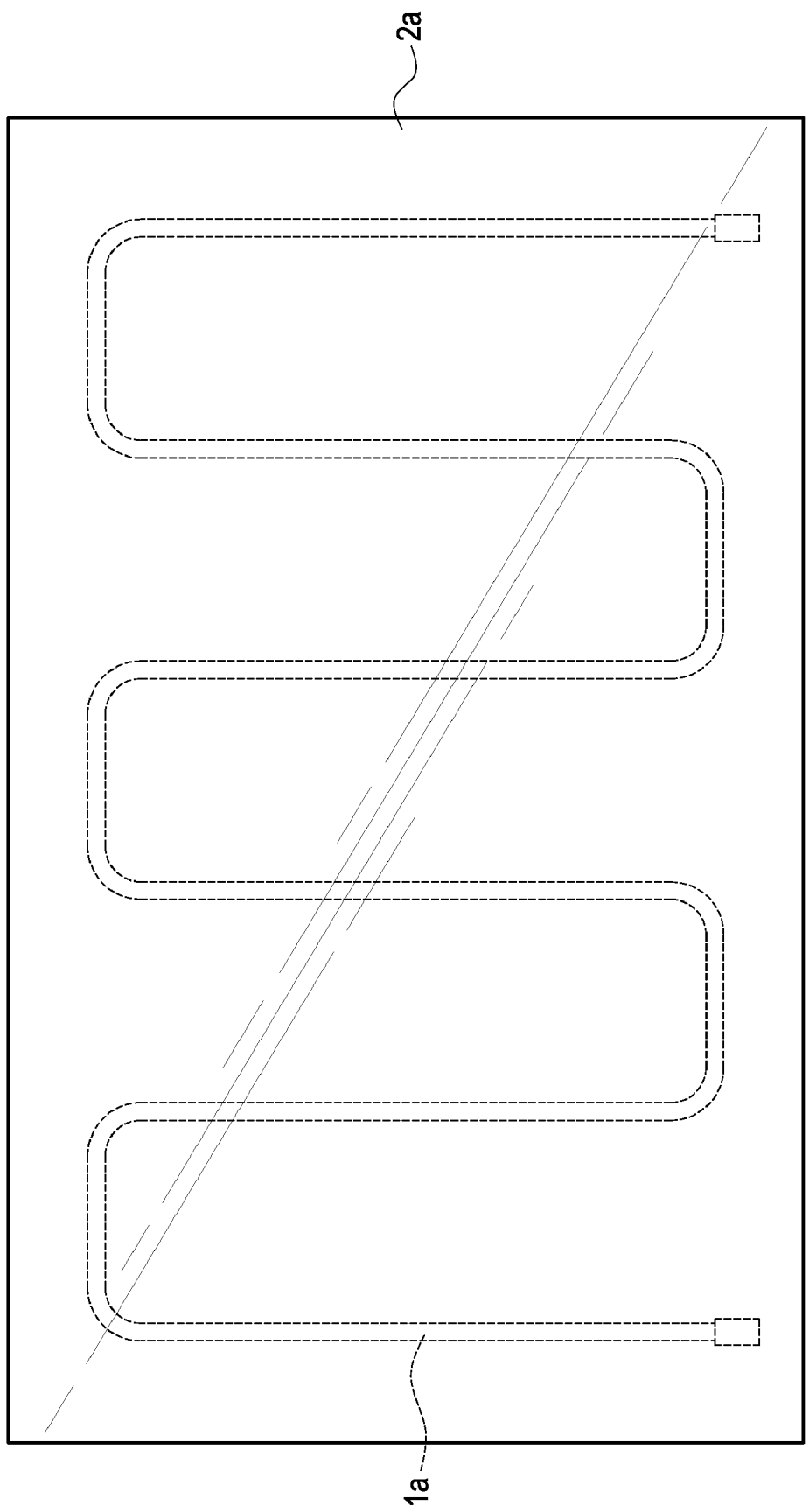
FIG. 2 is a schematic view of a second type of conventional backlight module structure.
Figure 3:
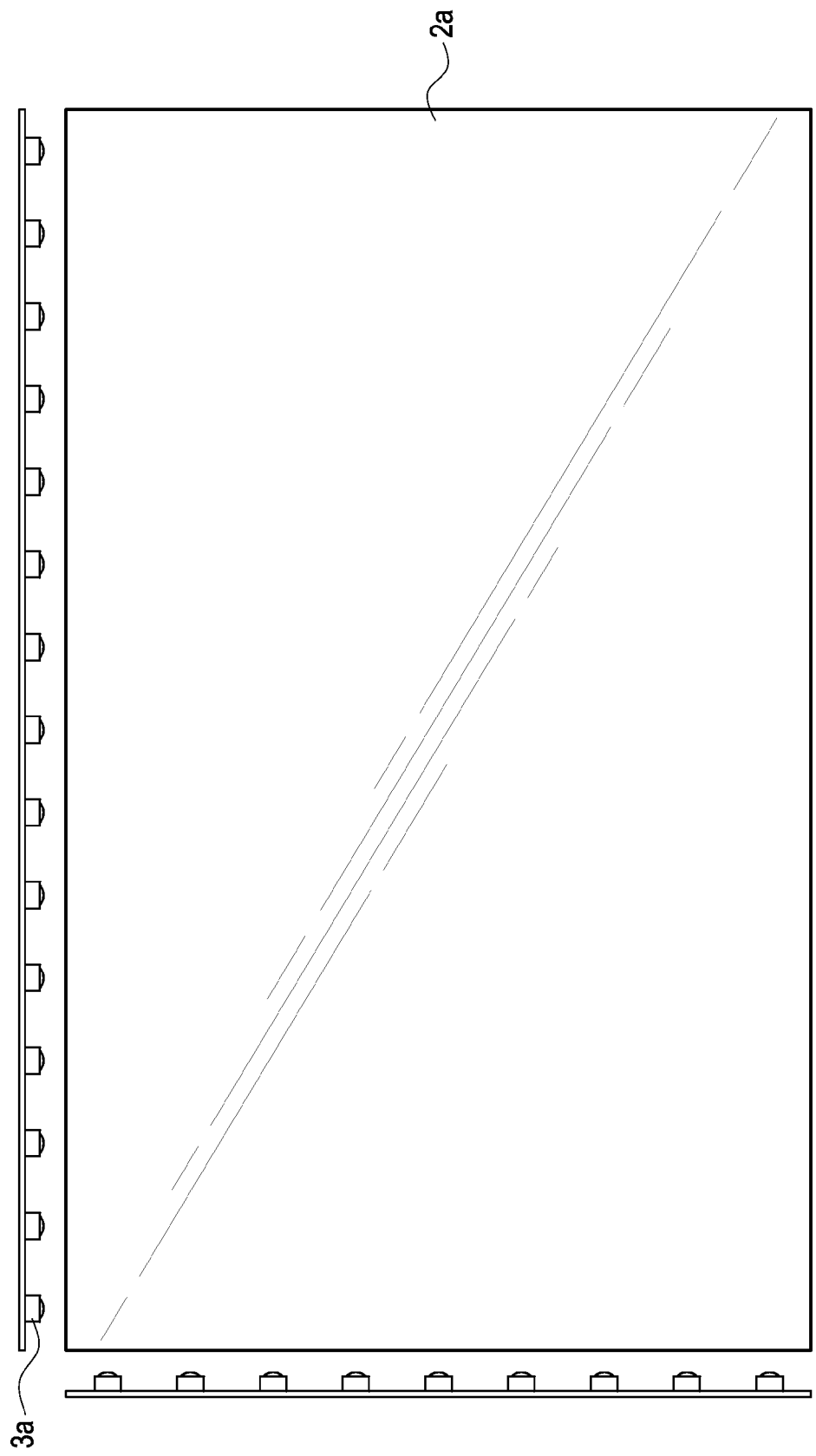
FIG. 3 is a schematic view of a third type of conventional backlight module structure.
Figure 4:
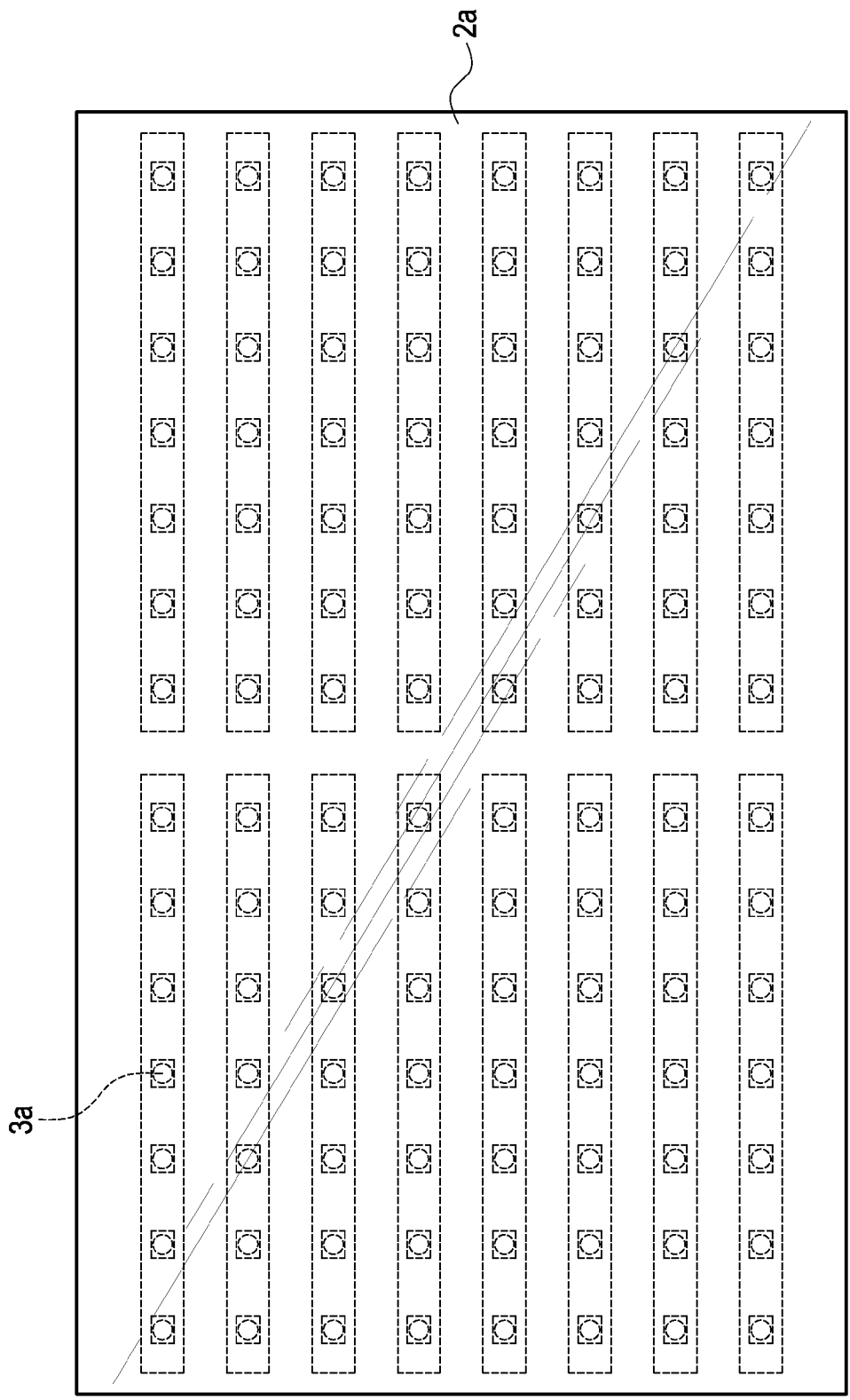
FIG. 4 is a schematic view of a fourth type of conventional backlight module structure.
Figure 5:
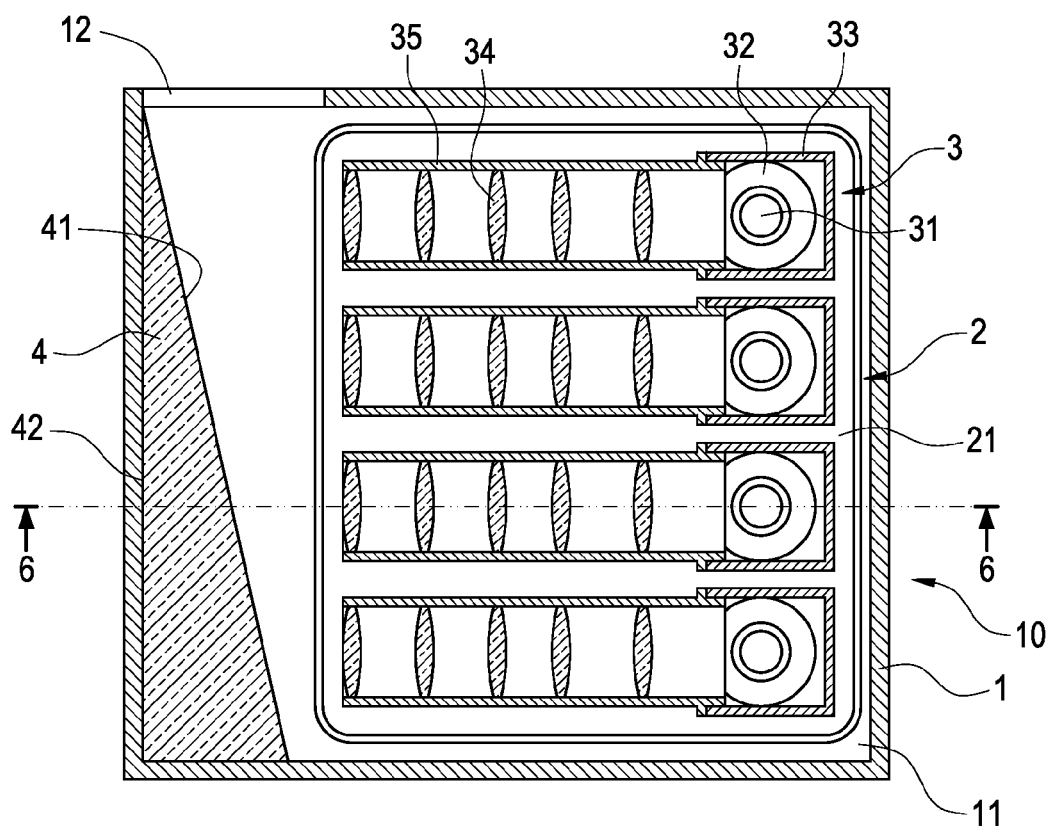
FIG. 5 is a bottom view of a light source structure of the present invention.
Figure 6:
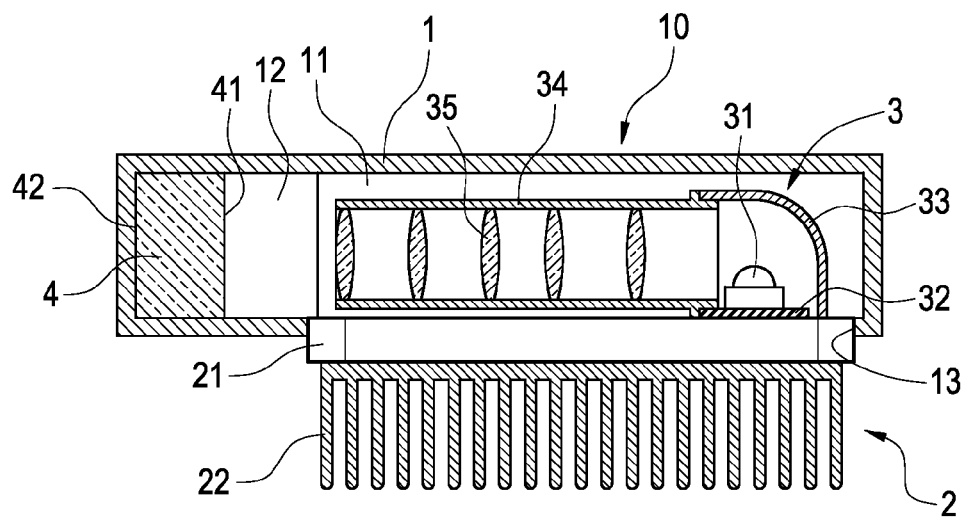
FIG. 6 is a cross-sectional view of Section 6-6 as depicted in FIG. 5.

Referring to FIGS. 5 and 6 for a bottom view of a light source structure of the invention and a cross-sectional view of Section 6-6 as depicted in FIG. 5 respectively, a light source structure 10 of a backlight module comprises: a casing 1, a heat sink 2, a plurality of light source generators 3 and a first reflecting element 4. The foregoing assembly is a light source structure having a heat dissipating effect and capable of converting a spot light source into a linear light source, and the linear light source into a planar light source to be projected outside the casing 1.

The foregoing casing 1 has a containing space 11 for accommodating a plurality of light source generators 2 and a reflecting element 3, and a lateral side of the casing 1a has an opening 12 and an installing slot 13, and the opening 12 and installing slot 13 are interconnected with the containing space 11.

The heat sink 2 is comprised of a thermal conducting element 21 and a heat dissipating fin 22 attached onto the surface of a thermal conducting element 21a, and the thermal conducting element 21 is installed on the installing slot 13. In the figures, the thermal conducting element 21 is a heat spread or a heat conducting module.

Figure 8:
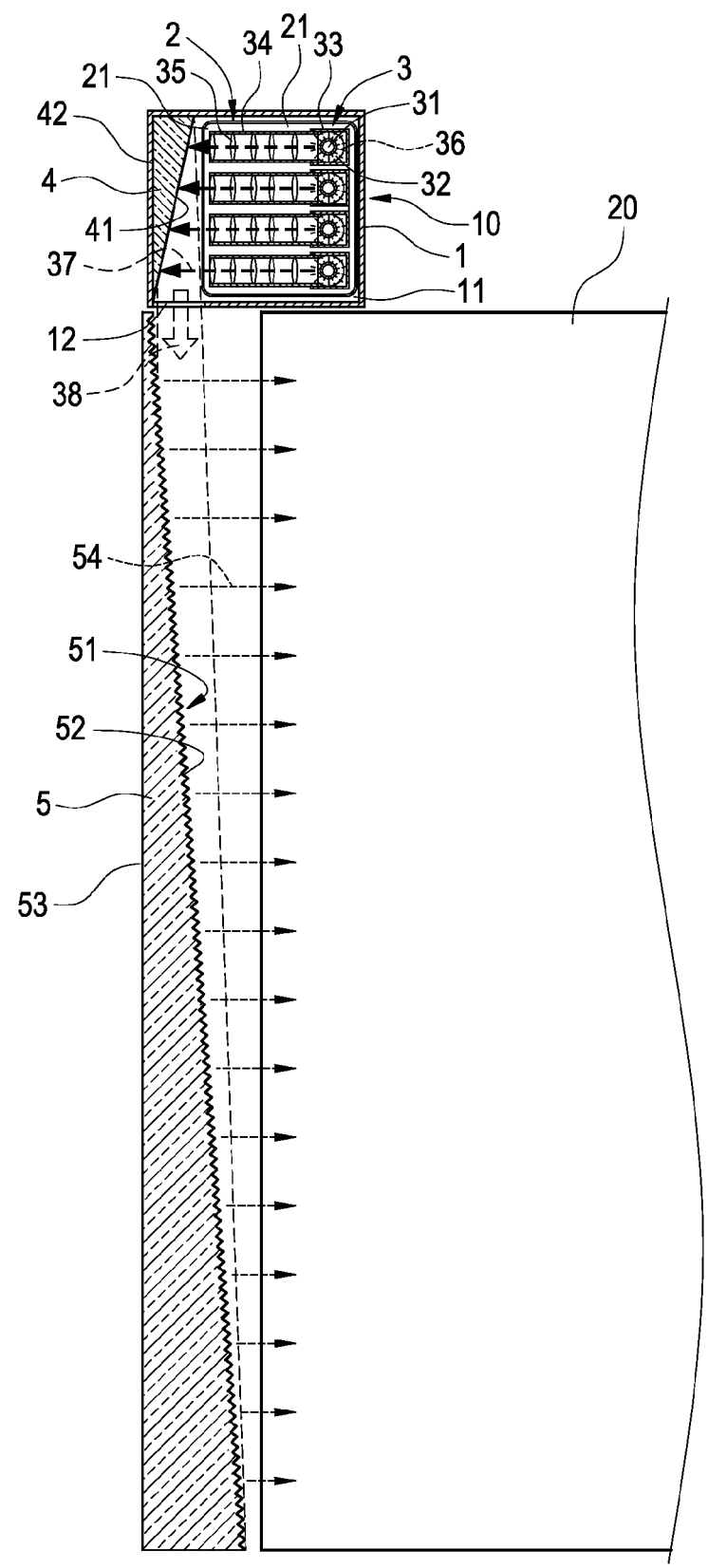
FIG. 8 is a schematic view of a first preferred embodiment of the present invention.

The plurality of light source generators 3 are installed on the thermal conducting element 21, and each light source generator 3 installs a light emitting component 31 on a substrate 32, and then installs the substrate 32 on the thermal conducting element 21. The thermal conducting element 21 installs a reflector 33 covered onto the light emitting component 31. A light pipe 34 is installed at an end where the reflector 33 and the substrate 32 are connected, and the light pipe 34 is interconnected with the reflector 33 and installs a plurality of corresponding optical lenses 35 for focusing a spot light source of the light emitting component 31 to produce an output of a linear light source. In the figures, the light emitting component 31 is a light emitting diode (LED), and the light source produced by the light emitting component 31 is transmitted from the first reflecting element 4 to the second reflecting element 5 (as shown in FIG. 8), and then to the light guide plate (not shown in the figure). The shorter the optical path, the smaller is the number of watts used for the light emitting diode (indicating a lower brightness). The longer the optical path, the larger is the number of watts used for the light emitting diode (indicating a higher brightness). In addition, the optical lens 35 is a convex lens.

The first reflecting element 4 is installed in the containing space 11, and the first reflecting element 4 includes an oblique surface 41 perpendicular to the plurality of light source generators 3, and the thinner end between the bottom surface 42 and the oblique surface 41 of the first reflecting element 4 is disposed proximate to the opening 12, such that the oblique surface 41 and the opening 12 are disposed corresponding to each other, and the oblique surface 41 also can reflect the linear light source guided by the light pipe 34 as a planar light source to the outside of the casing 1. In the figures, the first reflecting element 4 is a right-angled triangular body.

Figure 7:
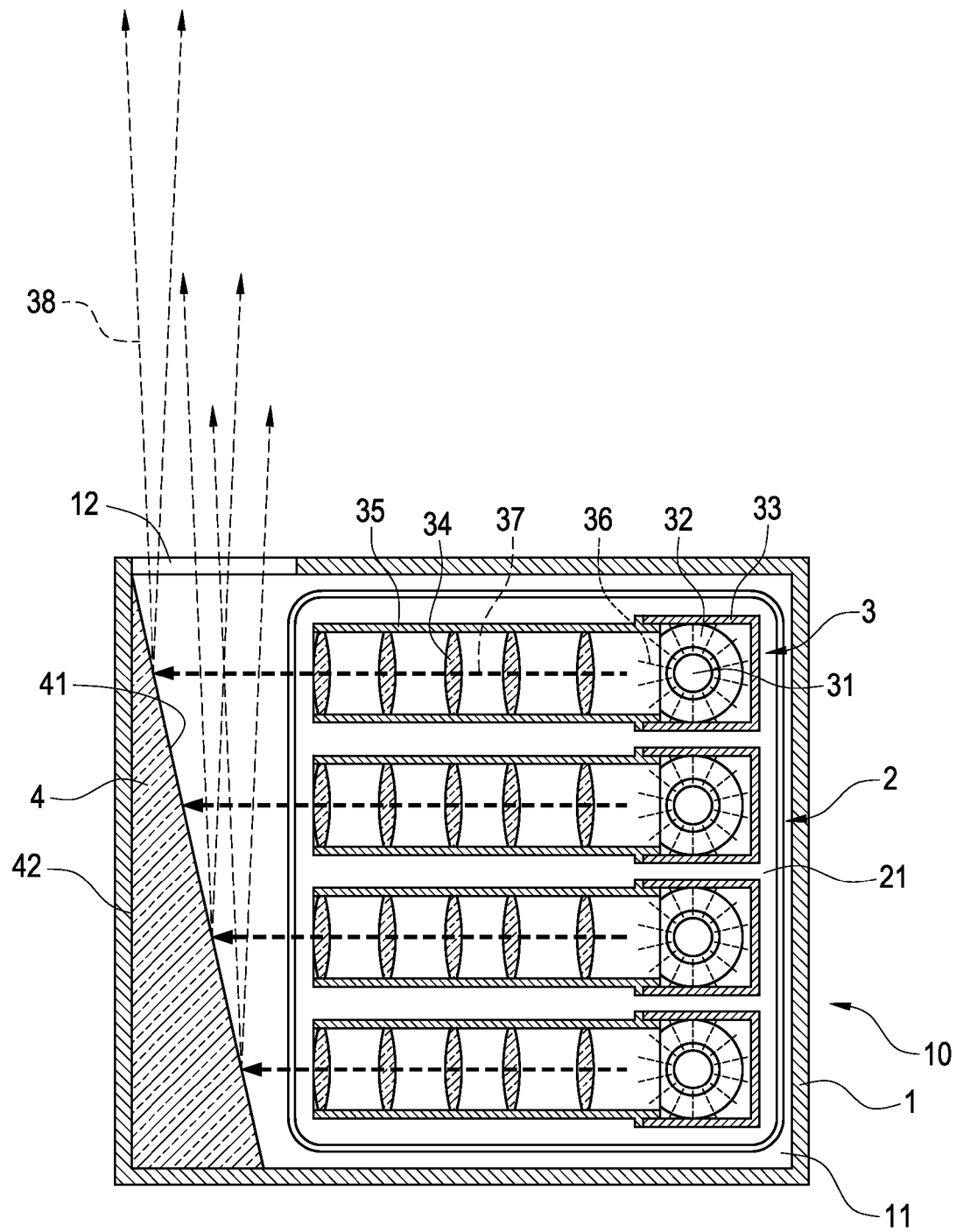
FIG. 7 is a schematic view of an optical path of a light source structure of the present invention.

Referring to FIG. 7 for a schematic view of an optical path of a light source structure of the present invention, if the light emitting component 31 of the light source structure 10 is lit, the reflector 33 will reflect, focus and convert the spot light source 36 of the light emitting component 31 into a linear light source 37 by the optical lenses 35 in the light pipe 3, and the linear light source 37 will be projected onto the oblique surface 41 of the first reflecting element 4, and the oblique surface 41 will convert the linear light source 37 into a planar light source 38 to be projected outside the casing 1 through the opening 12.

If the light emitting component 31 is lit, the produced heat source will be absorbed directly by the thermal conducting element 21 of the heat sink 2 and transmitted to the heat dissipating fin 22 and dissipated from the heat dissipating fin 22 to the outside. The light emitting component 31 can dissipate heat effectively, so that the light emitting efficiency of the light emitting component 31 can meet the requirement of its specification and also extend the life expectancy of the light emitting component 31.

Referring to FIG. 8 for a schematic view of a first preferred embodiment of the present invention, a small backlight module comprises: a light guide plate 20 and a light source structure 10 installed on a lateral side of the light guide plate 20a. The light source structure 10 further comprises a second reflecting element 5 installed on a lateral side of the light guide plate 20a, and the second reflecting element 5 has an oblique surface 51 disposed corresponding to a lateral side of the light guide plate 20a, and the oblique surface 51 has a protrusion 52 for refracting a continuous light source, such that the light source can be diffused to achieve a uniform light source. A thin end between the bottom surface 53 and the oblique surface 51 of the second reflecting element 5 is disposed proximate to the opening 12, such that the oblique surface 51 and the opening 12 correspond to each other. In the figure, the second reflecting element 5 is a right-angled triangular body.

If the light emitting component 31 of the light source structure 10 is lit, the reflector 33 will reflect the spot light source 36 of the light emitting component 31, and then the optical lenses 35 in the light pipe 34 will focus and convert the spot light source 36 into a linear light source 37 to be projected onto an oblique surface 41 of the first reflecting element 4, and then the oblique surface 41 will convert the linear light source 37 into a planar light source 38 to be projected onto an oblique surface 51 of the second reflecting element 5 through the opening 12, and the oblique surface 51 will guide the planar light source 54 into the light guide plate 20 for diffusing the light uniformly in the light guide plate 20.

Figure 9:
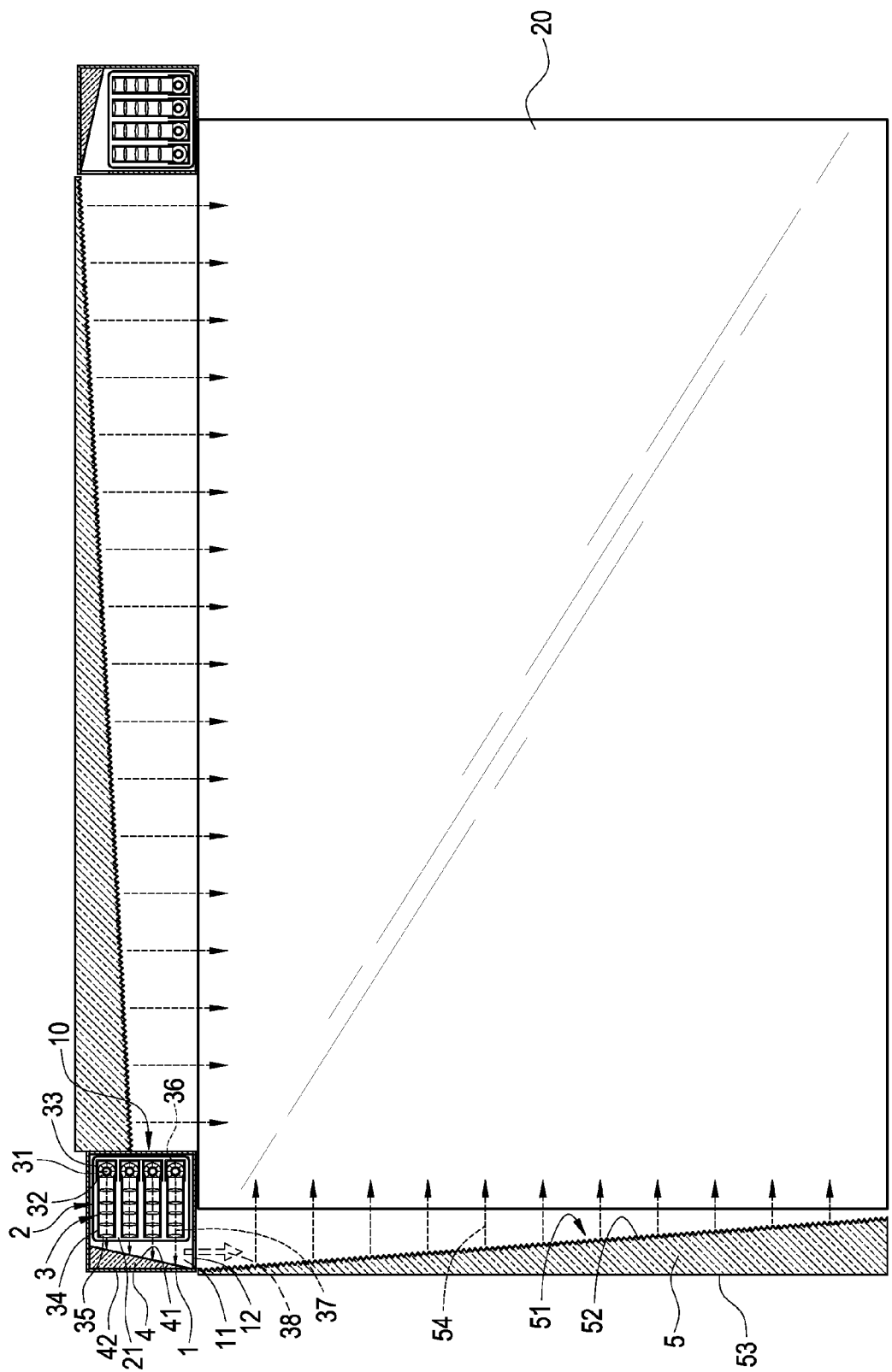
FIG. 9 is a schematic view of a second preferred embodiment of the present invention.

Referring to FIG. 9 for a second preferred embodiment of the present invention, a backlight module is substantially the same as that illustrated in FIG. 8, and the difference resides on that the second preferred embodiment has a plurality of light source structures 10. During the transmission of a light source, the brightness of the light guide plate 20 at a farther distance from the light source is insufficient, and thus another light source structure 10 is usually added to the light guide plate 20. If the light emitting component 31 of the light source structure 10 is lit, the reflector 33 will reflect the spot light source 36 of the light emitting component 31, and then the optical lenses 35 in the light pipe 34 will focus and convert the spot light source 36 into a linear light source 37 to be projected onto the oblique surface 41 of the first reflecting element 4, and then the oblique surface 41 will convert the linear light source 37 into a planar light source 38 to be projected onto the oblique surface 51 of the second reflecting element 5 through the opening 12. The oblique surface 51 guides the planar light source 54 into the light guide plate 20 and allows the light inside the light guide plate 20 to be diffused uniformly, such that the light guide plate 20 can show sufficient brightness.

Figure 10:
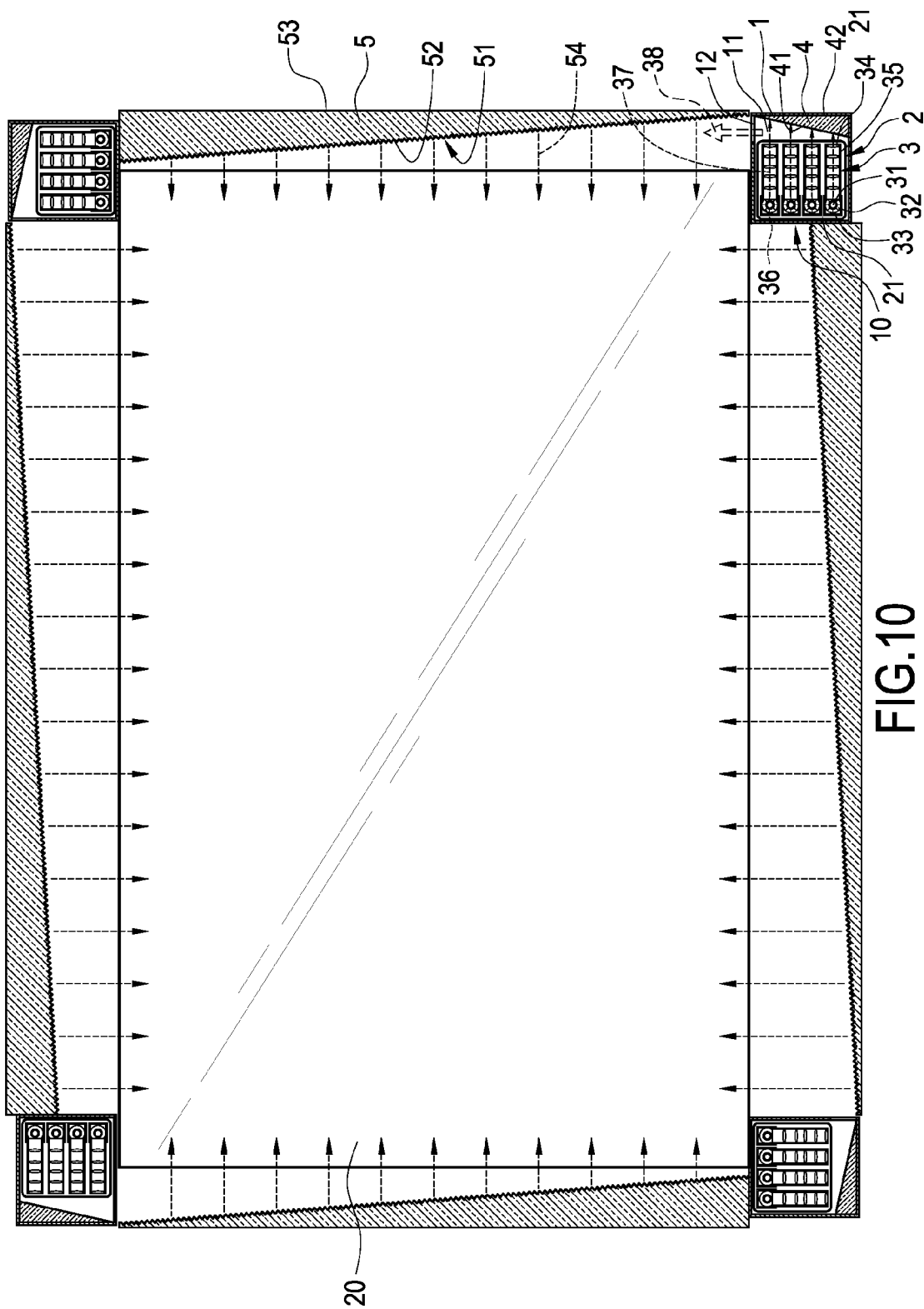
FIG. 10 is a schematic view of a third preferred embodiment of the present invention.

Referring to FIG. 10 for a third preferred embodiment of the present invention, a large backlight module installs a light source structure 10 at each of the four sides of the light guide plate 20, such that if the light emitting component 31 is lit, the reflector 33 will reflect the spot light source 36 of the light emitting component 31, and then the optical lenses 35 in the light pipe 34 will focus and convert the spot light source 36 into a linear light source 37 to be projected onto the oblique surface 41 of the first reflecting element 4, and the oblique surface 41 will convert the linear light source 37 into a planar light source 38 to be projected onto the oblique surface 51 of the second reflecting element 5 through the opening 12, and then the oblique surface 51 will guide the planar light source 54 into the light guide plate 20, such that the light inside the light guide plate 20 can be diffused uniformly, and the large light guide plate 20 can show sufficient brightness.

Figure 11:
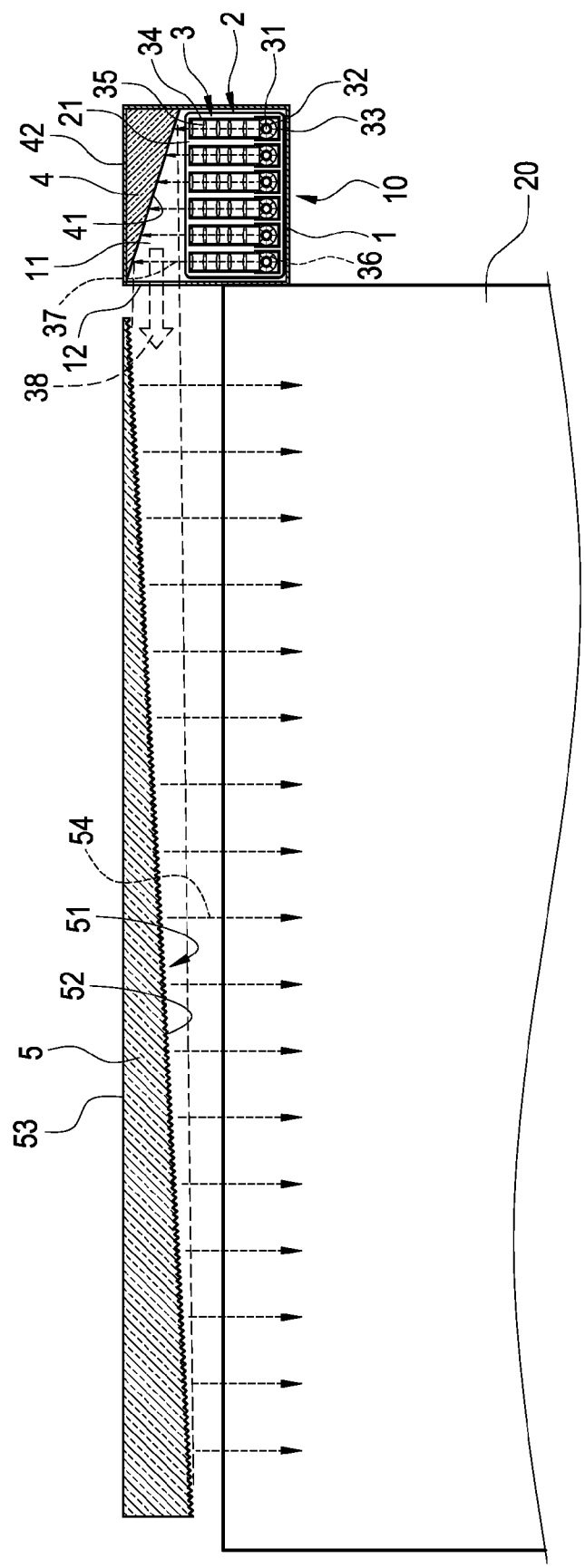
FIG. 11 is a schematic view of a fourth preferred embodiment of the present invention.

Referring to FIG. 11 for a fourth preferred embodiment of the present invention, a large backlight module installs a light source structure 10 at each side of the light guide plate 20, and adds a plurality of light source generators 3 in the light source structure 10, and the light source produced by the light emitting component 31 is transmitted from the first reflecting element 4 to the second reflecting element 5, and then to the light guide plate 20. The shorter the optical path, the smaller is the number of watts used for the light emitting diode (indicating a lower brightness). The longer the optical path, the larger is the number of watts used for the light emitting diode (indicating a higher brightness).

If the light emitting component 31 is lit, the reflector 33 will reflect the spot light source 36 of the light emitting component 31, and the optical lens 35 in the light pipe 34 will focus and convert the spot light source 36 into a linear light source 37 to be projected onto the oblique surface 41 of the first reflecting element 4, and the oblique surface 41 will convert the linear light source 37 into a planar light source 38 to be projected onto the oblique surface 51 of the second reflecting element 5 through the opening 12, and the oblique surface 51 will guide the planar light source 54 into the light guide plate 20, such that the light inside the light guide plate 20 can be diffused uniformly to allow the large light guide plate 20 to show sufficient brightness.

Figure 12:
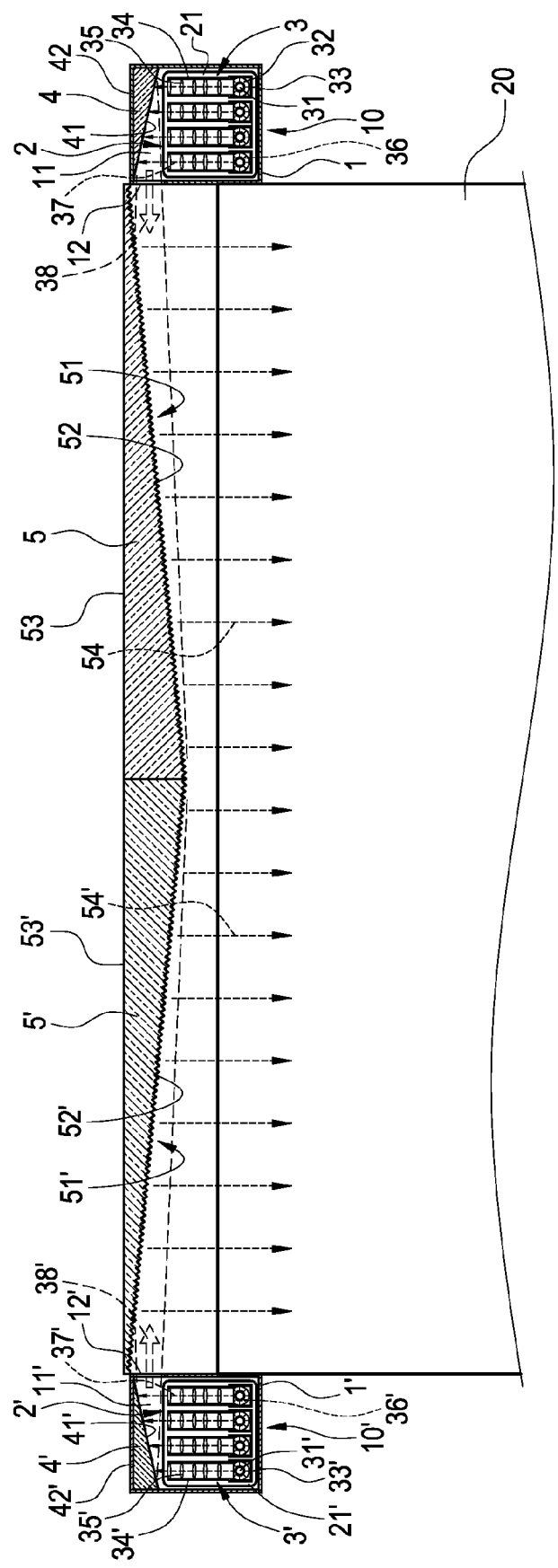
FIG. 12 is a schematic view of a fifth preferred embodiment of the present invention.

Referring to FIG. 12 for a fifth preferred embodiment of the present invention, a large backlight module can install a light source structure 10, 10' on both lateral sides of the light guide plate 20. If the light emitting component 31, 31' of the light source generator 3, 3' is lit, the reflector 33, 33' will reflect the spot light source 36, 63' of the light emitting component 31, 31', and the optical lenses 35, 35' in the light pipe 34, 34' will focus and convert the spot light source 36, 36' into a linear light source 37, 37' to be projected onto the oblique surface 41, 41' of the first reflecting element 4, 4', and the oblique surface 41, 41' will convert the linear light source 37, 37' into a planar light source 38, 38' to be projected onto the oblique surface 51, 51' of the second reflecting element 5, 5' outside the casing 1, 1' through the opening 12, 12', and the oblique surface 51, 51' will guide the planar light source 54, 54' into the light guide plate 20, such that the light inside the light guide plate 20 can be diffused uniformly to allow the large light guide plate 20 to show sufficient brightness.

The present invention is illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A light source structure of backlight module, installed on a lateral side of a light guide plate, comprising:

a casing, installed on a side of the light guide plate, and having a containing space therein, and an opening disposed on a lateral side of the casing and interconnected with the containing space;

a plurality of light source generators, installed in the containing space, and each light source generator being installed onto a substrate through a light emitting component, and a reflector being installed on the light emitting component, a light pipe being connected to an end where the reflector and the substrate are connected;

a first reflecting element, installed in the containing space, and having an oblique surface perpendicular to a plurality of light source generators, and the oblique surface of the first reflecting element disposed corresponding to the opening;

a second reflecting element coplanar with the first reflecting element, installed on a lateral side of the light guide plate, and having an oblique surface disposed corresponding to the light guide plate, and the oblique surface of the second reflecting element disposed corresponding to the opening, and an inclination between the oblique surface of the second reflecting element and the oblique surface of the first reflecting element being in a range from about 90 degrees to about 180 degrees;

thereby, the light pipe focuses and converts the spot light source of the light emitting component into a linear light source to be projected onto the oblique surface of the first reflecting element, and the oblique surface converts the linear light source into a planar light source to be projected onto the oblique surface of the second reflecting element through the opening, and the oblique surface of the second reflecting element guides the planar light source into the light guide plate.

2. The light source structure of backlight module as recited in claim 1, wherein the light emitting component is a light emitting diode.

3. The light source structure of backlight module as recited in claim 1, wherein the light source produced by the light emitting component is guided from the first reflecting element to the second reflecting element, and then to the light guide plate; the shorter the traveling distance of the light, the smaller is the number of watts used for the light emitting diode; and the longer the traveling distance of the light, the larger is the number of watts used in the light emitting diode.

4. The light source structure of backlight module as recited in claim 1, wherein the oblique surface of the second reflecting element has a protrusion for refracting a continuous light.

5. The light source structure of backlight module as recited in claim 1, wherein the casing includes an installing slot disposed on a lateral side of the casing, and a heat sink is installed into the installing slot.

6. The light source structure of backlight module as recited in claim 5, wherein the heat sink includes a thermal conducting element coupled with the installing slot, and a surface of the thermal conducting element is in contact with the substrate of the light emitting component.

* * * * *